United States Patent
Rubenacker et al.

(10) Patent No.: US 6,325,126 B1
(45) Date of Patent: Dec. 4, 2001

(54) NOZZLE FOR HEAT WELDING OVERLAPPING ROOF MEMBRANES TO EACH OTHER ALONG SEPARATED FIRST AND SECOND PATHS

(75) Inventors: James Rubenacker, Lakeville; Brian Whelan, Canton; Paul Peterson, Raynham, all of MA (US); Claus Pfotenhauer, Alpnach-Dorf (CH)

(73) Assignee: Sarnafil, Inc., Canton, MA (US)

( * ) Notice: Subject to any disclaimer, the term of this patent is extended or adjusted under 35 U.S.C. 154(b) by 0 days.

(21) Appl. No.: 09/399,129

(22) Filed: Sep. 20, 1999

(51) Int. Cl.[7] ..................................... B32B 31/08
(52) U.S. Cl. .................. 156/497; 156/499; 156/544; 156/574; 239/592
(58) Field of Search ................... 156/497, 499, 156/544, 574, 579, 359, 578; 239/592, 593, 594, 595, 548; D15/144

(56) References Cited

U.S. PATENT DOCUMENTS

| | | |
|---|---|---|
| D. 294,362 * | 2/1988 | Sinclair ........................ D15/144 |
| 3,276,425 * | 10/1966 | Rabb . |
| 4,087,309 | 5/1978 | Lang ............................ 156/497 |
| 4,440,588 | 4/1984 | Stevenson et al. ............. 156/157 |
| 4,834,828 | 5/1989 | Murphy ......................... 156/359 |
| 4,855,004 | 8/1989 | Chitjian ........................ 156/359 |
| 5,110,398 | 5/1992 | Murphy ......................... 156/499 |
| 5,234,533 | 8/1993 | Neal ............................. 156/497 |
| 5,335,860 * | 8/1994 | Hieftje et al. ................ 239/469 |
| 5,816,019 | 10/1998 | Saget et al. ................. 53/373.9 |
| 5,935,357 | 8/1999 | Hubbard et al. ............... 156/82 |
| 6,187,122 | 2/2001 | Hubbard et al. ............... 156/82 |

* cited by examiner

Primary Examiner—Richard Crispino
Assistant Examiner—Sue A. Purvis
(74) Attorney, Agent, or Firm—Pandiscio & Pandiscio; Scott R. Foster

(57) ABSTRACT

A nozzle for directing discrete streams of air along separated and parallel first and second paths includes a chamber for receiving air of a selected temperature, a first outlet arm extending from the chamber and having a first outlet at a distal end thereof and in a first outlet plane, and a second outlet arm extending from the chamber and having a second outlet at a distal end thereof and in a second outlet plane, an axis of the second outlet arm being generally parallel with an axis of the first outlet arm, the second outlet plane being offset from the first outlet plane.

19 Claims, 6 Drawing Sheets

NOZZLE FOR HEAT WELDING OVERLAPPING ROOF MEMBRANES TO EACH OTHER ALONG SEPARATED FIRST AND SECOND PATHS

BACKGROUND OF THE INVENTION

1. Field of the Invention

The invention relates to a nozzle for directing discrete streams of air along separated and parallel first and second paths, and is directed more particularly to such a nozzle for a device for heat welding two overlapping roof and/or waterproofing membranes to each other.

2. Description of the Prior Art

It is known to provide a device for heat welding two overlapping roof membranes to each other, and to provide such device with a nozzle for directing discrete streams of fluid along separated and parallel first and second weld paths. See, for example, U.S. Pat. No. 4,834,828, issued May 28, 1989, to Colin R. R. Murphy.

The Murphy patent relates to a machine for effecting continuous heat welds on either side of a fastener means, such as a row of fasteners, or an elongated bar. To effect the parallel welds simultaneously, the Murphy machine is provided with a nozzle which directs a stream of hot air to generally parallel paths on both sides of the fastener means. The upper overlapping membrane is heat sealed to the lower overlapped membrane along the overlap portion to seal the two membranes together on either side of the fastener means. The fastener means fastens the lower membrane to an uppermost hard surface of a roof, and is, in turn, covered by the upper membrane. To effect the two welds simultaneously, the nozzle is essentially a bifurcated nozzle which is moved by the machine between the two membranes, under an edge of the upper membrane.

The Murphy nozzle is provided with two outlets substantially side-by-side and in substantially the same plane, heightwise. The two outlets are separated by a bridge portion which connects the two outlets and channels hot air thereto. It has been found that the nozzle arrangement is not entirely satisfactory in that the closeness of the two welding locations causes one to adversely influence the other. It has been found that air flows vary in intensity and temperature due to nozzle design. Further, hot air from one nozzle outlet crosses over to the area impacted by the other nozzle outlet and causes bubbling or rippling of the upper membrane on the lower membrane. It has further been found that the two outlets, being in substantially the same plane, both tend to drag along the surface of the lower membrane and cause the nozzle bridge portion, i.e., the nozzle portion between the two outlets, to move along the fastener means with insufficient clearance. Still further, because the Murphy nozzle outlets are in the same vertical plane, and weld simultaneously, the membranes tend to move, causing wrinkles. When the fastener means comprises a row of discrete fasteners or elements, the nozzle bridge portion is bounced upwardly upon encountering a fastener or element, causing the nozzle outlets to rise momentarily, effecting a non-welding segment in both weld paths and potentially creating "fishmouths" in seams. The Murphy nozzle, when inserted into the membrane overlays, is locked into position and cannot accommodate irregularities in the substrate without diminishing seam quality.

There is thus a need for an improved nozzle of the type described above, but in which the welds are effected concurrently but at points removed from each other such that one weld contributes to another, rather than detracting from the other, and in which the welds are effected continuously and free from interruptions caused by collisions with the fastener means.

SUMMARY OF THE INVENTION

It is, therefore, an object of the invention to provide an improved nozzle for directing discrete streams of hot air along separated and parallel first and second paths.

A further object of the invention is to provide an improved nozzle for a device for heat welding two overlapping roof membranes to each other, wherein a fastener means is disposed between the overlapping membranes.

With the above and other objects in view, as will hereinafter appear, a feature of the present invention is the provision of a nozzle for directing discrete streams of fluid along separated and generally parallel first and second paths. The nozzle comprises a chamber for receiving air of a selected temperature, a first outlet arm extending from the chamber and having a first outlet at a distal end thereof and in a first outlet plane, and a second outlet arm extending from the chamber and having a first portion adjoining the chamber and having an axis transverse to an axis of the first outlet arm, and having a second portion with a second outlet at a distal end thereof and in a second outlet plane, an axis of the second portion being generally parallel with the axis of the first outlet arm, the second outlet plane being offset from the first outlet plane.

In accordance with a further feature of the invention, there is provided a nozzle for a device for heat welding two overlapping roof membranes to each other, wherein a fastener means is disposed between the overlapping roof membranes, and the nozzle is mounted on the device and adapted to effect heat welds to the roof membranes on both sides of, and adjacent to, the fastener means. The nozzle comprises a tubular body defining a chamber for receiving heated air, a first outlet arm extending from the body and having a first outlet at a distal end thereof, a second outlet arm extending from the body and having a first portion adjoining the chamber and having an axis transverse to an axis of the first outlet arm, and having a second portion with a second outlet at a distal end thereof, an axis of the second portion being generally parallel with the axis of the first outlet arm. The second outlet arm first portion is recessed on an underside thereof so as to permit the fastener means to pass therethrough as the device and the nozzle move along the paths.

In accordance with a further feature of the invention, there is provided a roof membrane welding assembly for heat welding two overlapping roof membranes to each other, wherein a fastener means is disposed between the overlapping roof membranes, the assembly being mounted on a device adapted to effect heat welds to the roof membrane on both sides of, and adjacent to, the fastener means. The welding assembly comprises a nozzle provided with a chamber for receiving heated air, a first outlet arm extending from the chamber and having a first outlet at a distal end thereof, a second outlet arm extending from the chamber and having a second outlet at a distal end thereof, the first outlet being disposed in a first plane, and the second outlet being disposed in a second plane removed from the first outlet plane. A first weld wheel is mounted on the device adjacent to, and in operation immediately following, the nozzle first outlet. A second weld wheel is mounted on the device adjacent to, and in operation immediately following, the nozzle second outlet. One of the weld wheels is biased by biasing structure on the device toward the roof membrane in operation of the device.

In accordance with a still further feature of the invention there is provided a weld wheel assembly for disposition on a roof membrane welding machine and for positioning a weld wheel adjacent a nozzle hot air outlet for pressing an overlying roof membrane heated by the nozzle against an underlying roof membrane heated by the nozzle, for welding the membranes together. The assembly comprises a weld wheel rotatably mounted on an axle which is moveable toward and away from the membranes, and pressure exerting structure mounted on the device and operable to bias the axle toward the membranes during operation of the machine.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

Figure 1:
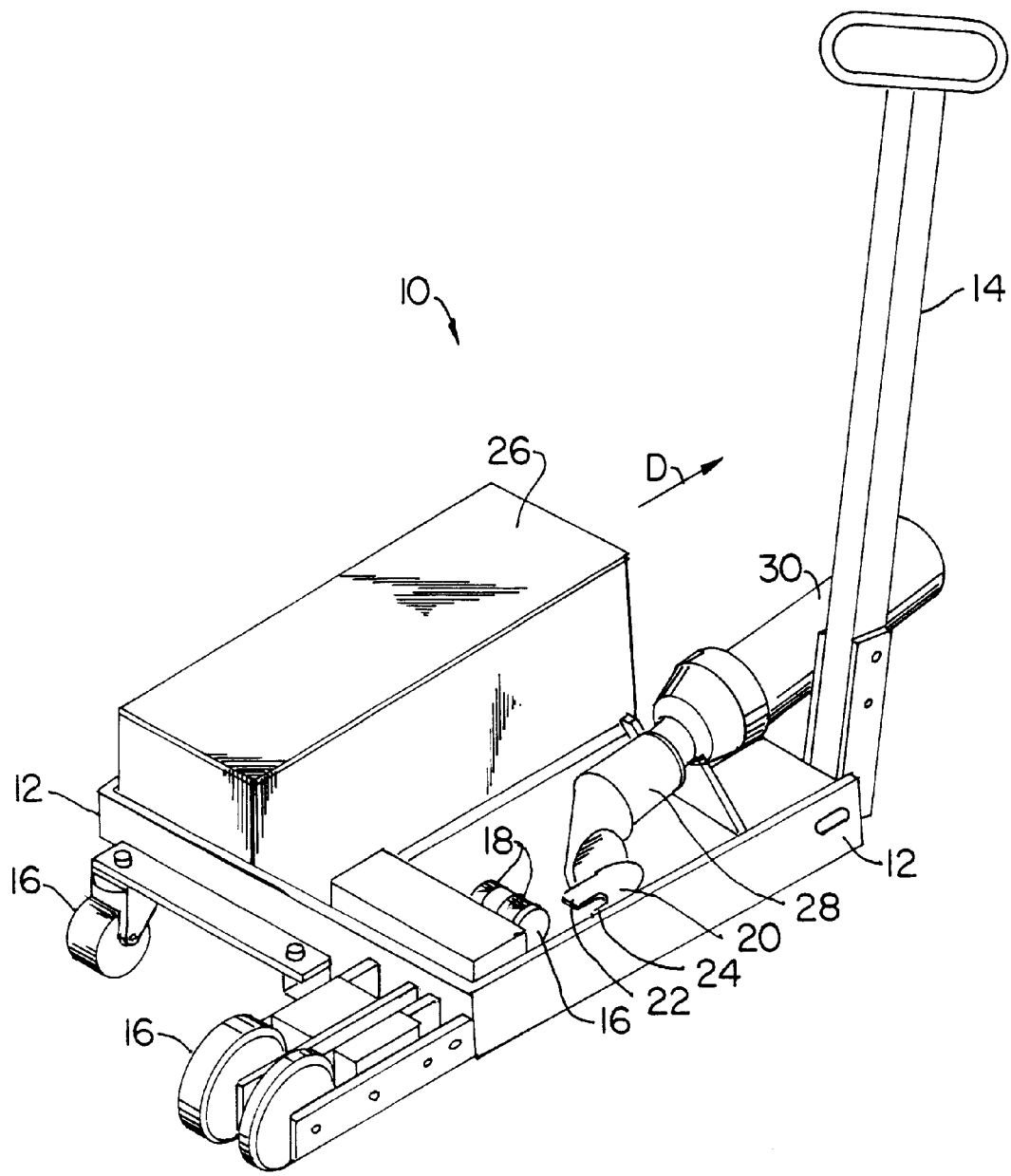
FIG. 1 is a perspective view of a prior art roof membrane welding machine.
Figure 2:
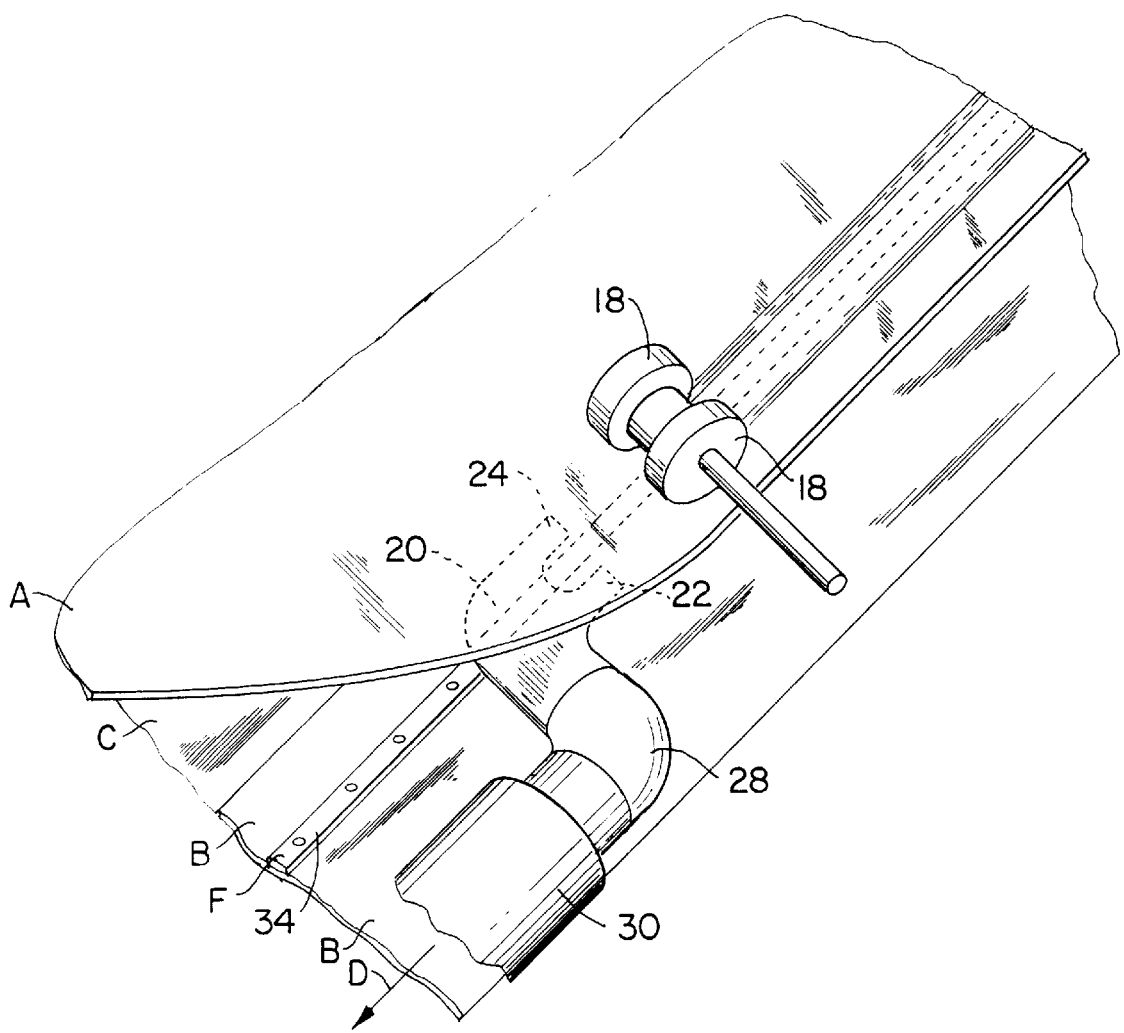
FIG. 2 is a perspective view of a prior art nozzle of the type shown on the machine of FIG. 1, and shown in a roof membrane welding operation.
Figure 3:
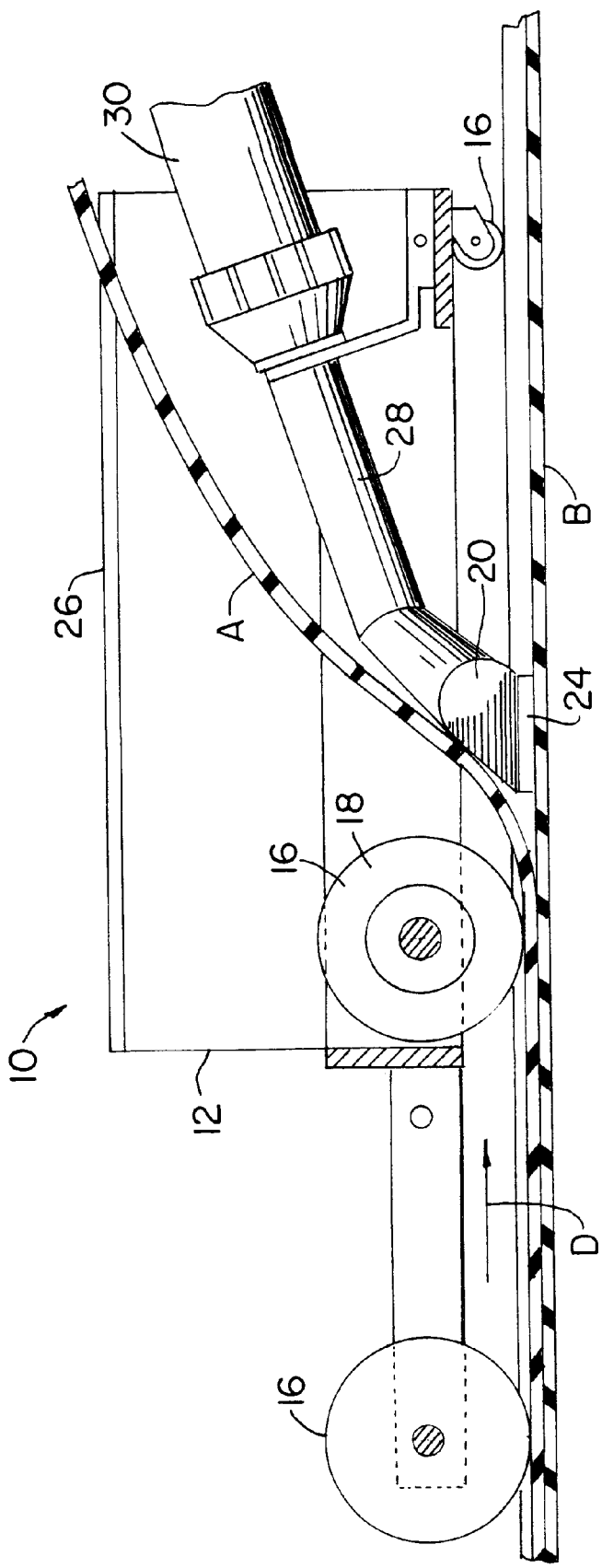
FIG. 3 is a partially sectional and partially elevational view of the machine and nozzle of FIGS. 1 and 2 in operation.

Referring to FIGS. 1–3, it will be seen that a machine 10 on which the invention finds particular utility comprises a frame 12 to which is fixed a handle 14 and on which are mounted wheels 16, including independent weld wheels 18. A hot air nozzle 20 is supported on the frame 12 and includes first and second outlets 22, 24 for directing two streams of hot air in spaced, generally parallel paths. A housing 26 is mounted on the frame 12 for enclosing a motor and various electrical components and controls (not shown). The nozzle 20 is fixed to a heating element 28 which, in turn, is fixed to a blower 30 which is carried by the frame 12.

In operation, the nozzle 20 is positioned between roofing membranes A and B (FIGS. 2 and 3) with the nozzle outlets 22, 24 on either side of a fastener means F by which the membrane B is secured to a roof uppermost hard surface C. The fastener means F may comprise a batten bar 34, as shown in FIG. 2, or may comprise a series of discrete stress plates, as is known in the art. The motor in the housing 26 drives the machine 10 in the direction of arrows D. The blower 30 forces air through the heating element 28 and through the nozzle 20. As the machine moves along, jets of hot air from the nozzle 20 weld the membranes A and B together along opposite sides of the fastener means. Immediately after the hot air welds, the independent weld wheels 18 press the upper membrane against the lower membrane to secure the membranes together. A detailed description of the operation of the machine is provided in the aforementioned '828 patent.

Referring to FIGS. 4–7, it will be seen that the illustrative nozzle 40 includes a tubular chamber 42 for receiving hot air at a selected temperature. The nozzle 40 further includes a hollow, generally flat, blade-like member 44 at a discharge end 46 of the chamber 42. The member 44 extends from the discharge end 46 of the chamber 42 generally normal to an axis a—a of the chamber 42.

Figure 4:
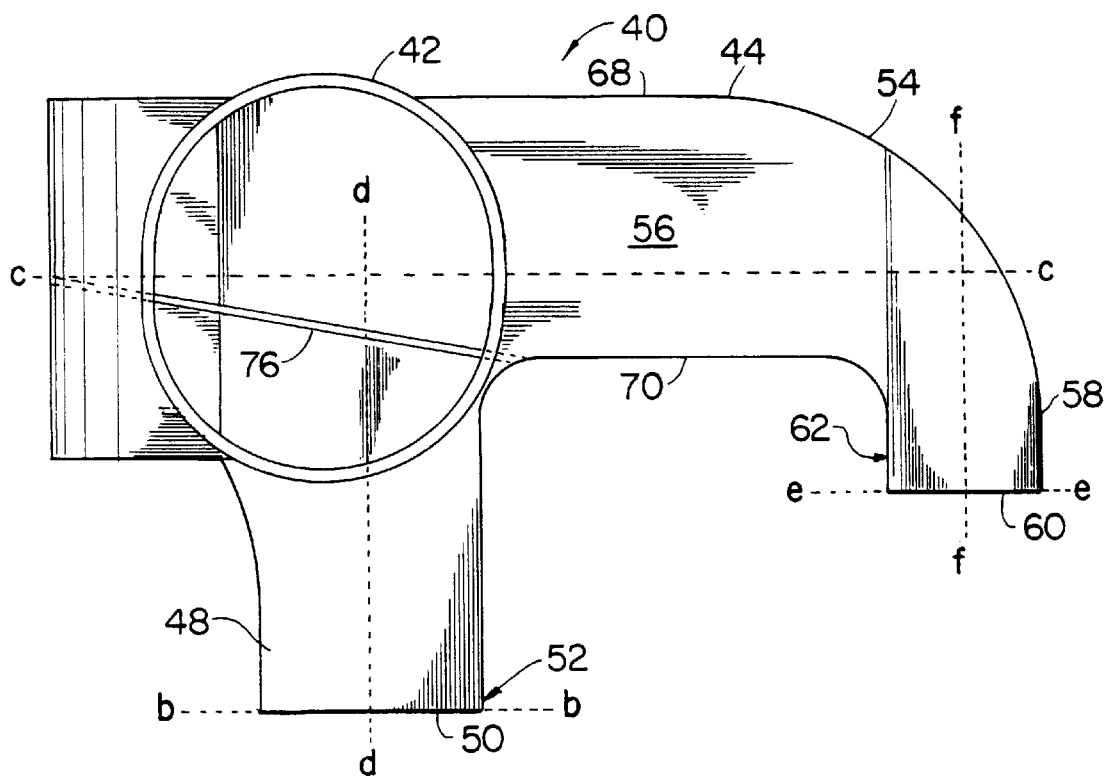
FIG. 4 is a top planar view of one form of nozzle illustrative of an embodiment of the invention.
Figure 7:
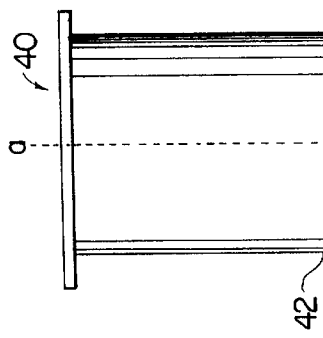
FIGS. 6 and 7 are side elevational views thereof.

The member 44 includes a first outlet arm 48 extending from the end 46 of the chamber 42, and having a first outlet 50 at a distal end 52 thereof and disposed in a first outlet plane b—b (FIG. 4). The member 44 further includes a second outlet arm 54 extending from the chamber 12 and having a first portion 56 adjoining the chamber 42. An axis c—c (FIG. 4) of the first portion 56 extends transversely to an axis d—d of the first outlet arm 48. The second outlet arm 54 is provided with a second portion 58 with a second outlet 60 at a distal end 62 thereof and in a second outlet plane e—e (FIG. 4). An axis f—f of the second portion 58 is generally parallel with the axis d—d of the first outlet arm 48. The second outlet plane e—e is offset forwardly of the first outlet plane b—b.

Figure 5:
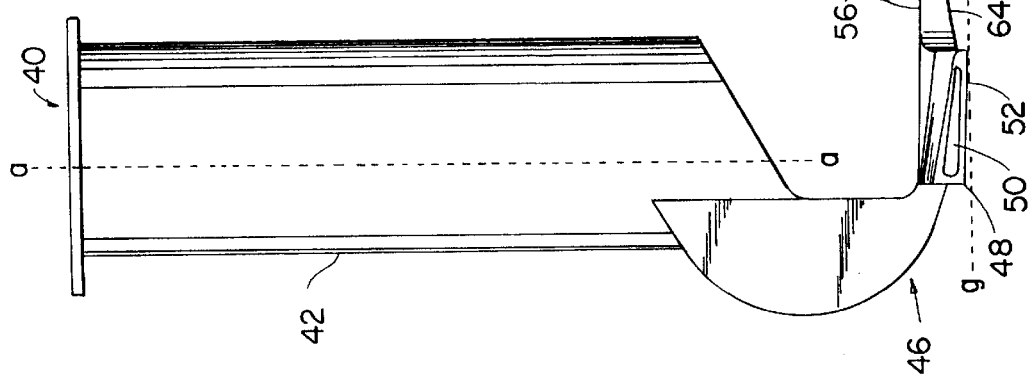
FIG. 5 is a rear elevational view of the nozzle of FIG. 4.
Figure 6:
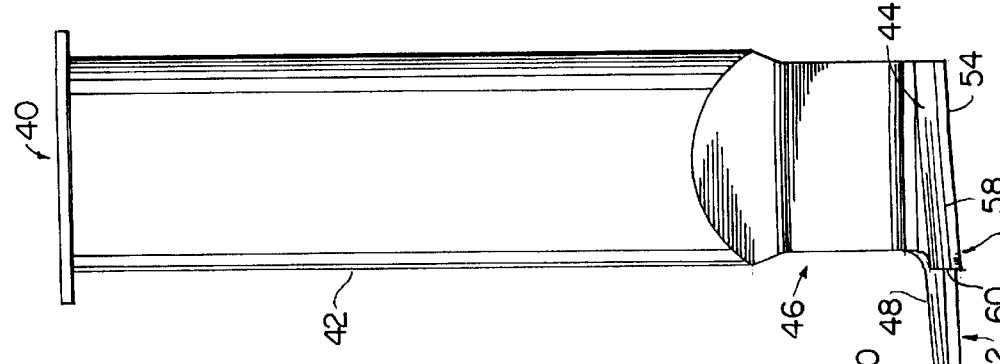

Referring to FIG. 5, it will be seen that the second outlet arm second portion 58 is further removed from the chamber 42 in a direction of the axis a —a of chamber 42, than is the first outlet arm 48. That is, in operation, the second outlet arm second portion 58, including the second outlet 60, moves closer to the roof membranes than the first outlet arm 48 and first outlet 50.

Referring still to FIG. 5, it will be seen that the first portion 56 of the second outlet arm 54 is provided on an underside 64 thereof with a recess 66 extending from a forward edge 68 (FIG. 4) of the second outlet arm first portion 56 to a trailing edge 70 thereof. The recess 66 is a curved concavity with a mid-point 72 (FIG. 5) being most removed from a bottom plane g—g of the second outlet arm second portion 58 and most proximate an upper surface 74 of the second outlet arm first portion 56.

As may be seen in FIGS. 4 and 5, the first outlet arm 48 and first outlet 50 are substantially wider side-to-side than the second outlet arm second portion 58 and second outlet 60.

Inasmuch as the configurations and dimensions of the nozzle outlets 50, 60 are different, an air flow divider 76 (FIG. 4) is provided near the bottom of the chamber 42 in an area of transition to the first outlet arm 48 and the second outlet arm portion 56. The disposition of the divider 76 provides for substantially equivalent airflow through the respective outlets 50, 60. Substantially equal pre-heating of the membrane surfaces is accomplished by selected sizes and positions of outlet apertures 78 provided in the undersurfaces of the outlet arms 48, 54 (FIG. 8), the apertures 78 extending in directions toward the membrane surfaces.

Figure 8:
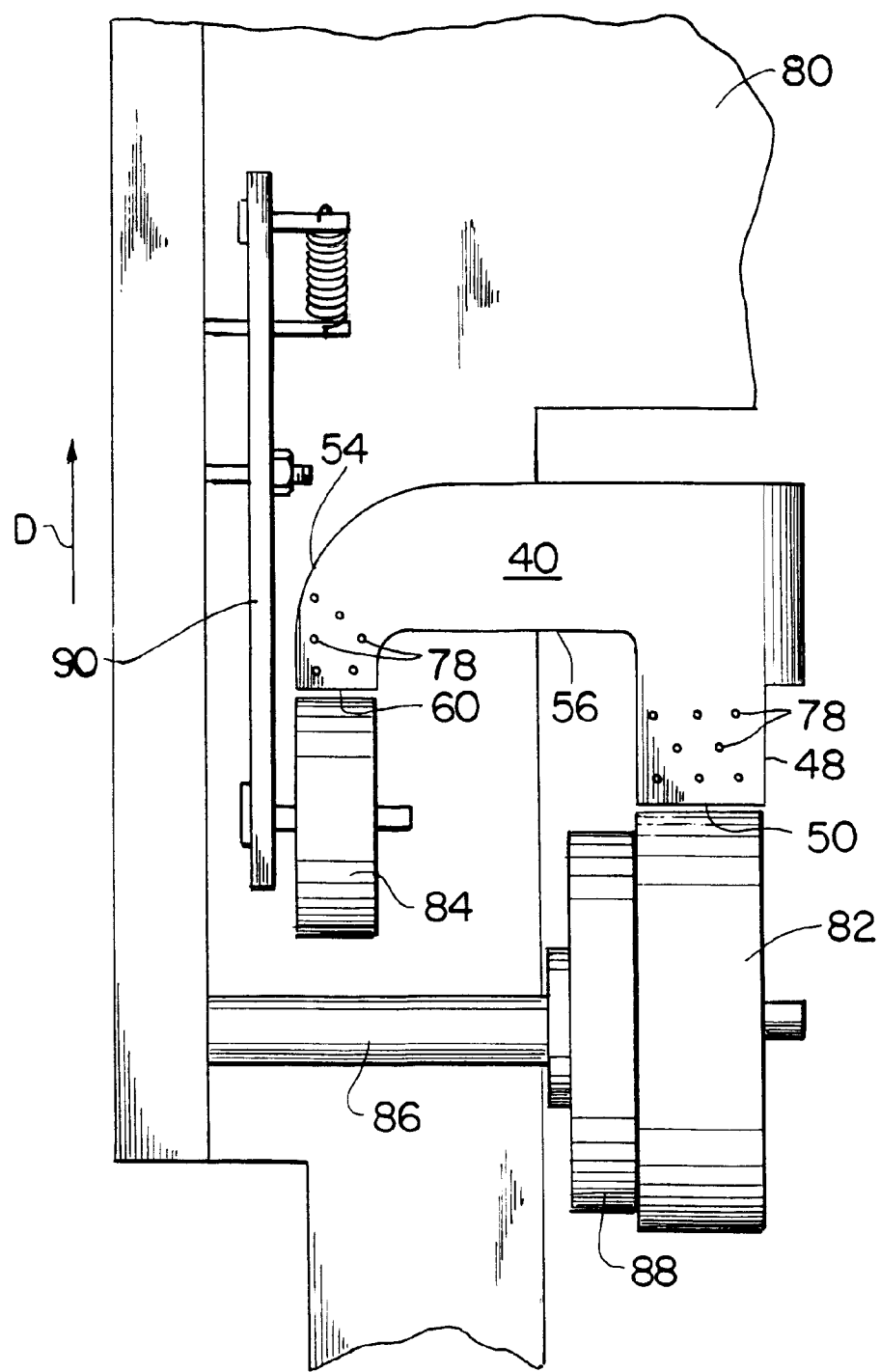
FIG. 8 is a bottom view of the nozzle of FIGS. 4–7 and a weld wheel assembly in place on a roof membrane welding machine.

Referring to FIG. 8, it will be seen that the nozzle 40 is mounted on a machine 80 for heat welding two overlapping roof or waterproofing membranes A, B, as described above, to effect heat welds to the roof membranes on both sides of, and adjacent to, the fastener means F.

As in the machine 10 of FIGS. 1–3, the nozzle outlets 50, 60 are closely followed in operation by weld wheels 82, 84. The nozzle first outlet 50 is followed by a traditional weld wheel 82. However, because the space available between the nozzle second outlet 60 and an axle 86 for the weld wheel 82 is limited, the nozzle second outlet 60 is followed by a weld wheel 84 of a substantially smaller size than the weld wheel 82. Further, while a weight 88 (FIG. 8) may easily be added to the weld wheel 82, similar weights of correspondingly smaller size for the small weld wheel 84 would have little impact on the pressing operation of the weld wheel 84. Still further, the position of the weld wheel 84 renders the placement of weights on the frame and directed toward the end of pressing the wheel 84 downwardly in use, problematic.

To provide the desired downwardly directed force on the weld wheel 84, the wheel 84 is mounted on a spring-biased lever 90 which biases the wheel 84 toward the welded seam with a force substantially equal to the force applied by the weld wheel 82.

In operation, the machine 80 is positioned relative to roof membranes A and B substantially as shown in FIGS. 2 and 3 with respect to machine 10. The heating element 28 and blower 30 are started by means well known in the art, as are other known controls, sensors, and the like. The machine 80 is moved along the roof membranes with the nozzle 40 discharging two discrete streams of hot air, one from the outlet 50 and the other from outlet 60. The two outlets 50, 60 effect seals simultaneously in the sense that both eject hot air at the same time. However, the nozzle outlets 50, 60 effect seals at any given time along their respective paths at points removed from each other, that is, in a staggered manner.

Referring to FIG. 8, it will be seen that as the machine 80 advances in the direction D, the nozzle outlet 60 proceeds in advance of the nozzle outlet 50. The weld wheel 84 follows immediately behind nozzle outlet 60. Thus, the first weld (effected by outlet 60) is accomplished well removed from the second weld (effected by outlet 50), and the first weld and the pressure application thereto by weld wheel 84 is accomplished without interference from the second weld hot air flow, resulting in better consistency and quality in the first weld. Further, inasmuch as the first weld is pressure closed ahead of the second weld, the first weld traps the hot air flowed in performance of the second weld in the vicinity of the second weld, such that hot air is retained in the second weld area, improving second weld consistency and quality.

Referring to FIG. 5, it will be seen that the second outlet 60 is further removed from the chamber 42 than the first outlet 50, in a direction of the lengthwise axis a-a of the chamber 42. That is, in operation, the second outlet 60 is lower, or closer to the membrane B, than the first outlet 50, and the first outlet 50 is higher, or further from the membrane B than the second outlet 60. Keeping in mind that the second outlet 60 moves ahead of the first outlet 50 in operation, hot air from the leading and lower second outlet 60 is able to move transversely toward an area beneath the following and slightly raised first outlet 50 to make a contribution to the weld of the first outlet 50. Further, the slightly raised position of the first outlet 50 insures that the first outlet remains elevated relative to the second outlet 60 and is positioned above the lower membrane even when the second outlet drags along the surface of the lower membrane B. During the course of the welding operation, the nozzle recess 66 always moves over the fastener means F, leading to uninterrupted welds of high quality and consistency.

There is thus provided an improved nozzle for directing discrete streams of hot air along first and second paths concurrently. There is further provided such a nozzle for heat sealing two overlapping roof membranes to each other, wherein a fastener means is disposed between the overlapping membranes. There is additionally provided a unique weld wheel arrangement which permits use of the above-described nozzle in a roof membrane welding machine.

It is to be understood that the present invention is by no means limited to the particular construction herein disclosed and/or shown in the drawings, but also comprises any modifications or equivalents within the scope of the claims.

What is claimed is:

1. A nozzle for concurrently directing discrete streams of fluid along separated and parallel first and second paths, said nozzle comprising:

a chamber for receiving air of a selected temperature;

a first outlet arm extending from said chamber and having a first outlet at a distal end thereof and in a first outlet plane; and a second outlet arm extending from said chamber and having a first portion adjoining said chamber and having an axis transverse to an axis of said first outlet arm, and having a second portion with a second outlet at a distal end thereof and in a second outlet plane, an axis of said second portion being generally parallel with said axis of said first outlet arm;

said second outlet plane being offset from said first outlet plane; and wherein said second outlet arm first portion is provided with a recess on an underside thereof.

2. A nozzle for concurrently directing discrete streams of fluid along separated and parallel first and second paths, said nozzle comprising:

a chamber for receiving air of a selected temperature;

a first outlet arm extending from said chamber and having a first outlet at a distal end thereof and in a first outlet plane; and a second outlet arm extending from said chamber and having a first portion adjoining said chamber and having an axis transverse to an axis of said first outlet arm, and having a second portion with a second outlet at a distal end thereof and in a second outlet plane, an axis of said second portion being generally parallel with said axis of said first outlet arm;

said second outlet plane being offset from said first outlet plane; and wherein said nozzle comprises a hollow, generally flat member.

3. A nozzle for concurrently directing discrete streams of fluid along separated and parallel first and second paths, said nozzle comprising:

a chamber for receiving air of a selected temperature;

a first outlet arm extending from said chamber and having a first outlet at a distal end thereof and in a first outlet plane; and a second outlet arm extending from said chamber and having a first portion adjoining said chamber and having an axis transverse to an axis of said first outlet arm, and having a second portion with a second outlet at a distal end thereof and in a second outlet plane, an axis of said second portion being generally parallel with said axis of said first outlet arm;

said second outlet plane being offset from said first outlet plane;

wherein said nozzle comprises a hollow, generally flat member; and wherein said second outlet arm first portion is provided with a recess on an underside thereof extending from a forward edge of said first portion to a trailing edge of said first portion.

4. The nozzle in accordance with claim 3 wherein said recess is a curved concavity with a mid-point of said concavity being most removed from a bottom plane of said second outlet arm second portion and most proximate an upper surface of said second outlet arm first portion.

5. A nozzle for concurrently directing first and second discrete streams of air along separated and parallel first and second paths disposed on either side of an upstanding structure, said nozzle comprising:

a chamber for receiving air of a selected temperature;

a first outlet arm extending from said chamber and having a first outlet at a distal end thereof; and a second outlet arm extending from said chamber and having a first portion adjoining said chamber and having an axis transverse to an axis of said first outlet arm, and having a second portion with a second outlet at a distal end thereof, an axis of said second portion being generally parallel with said axis of said first outlet arm;

said second outlet arm first portion being recessed on an underside thereof so as to permit the upstanding structure to pass therethrough as said nozzle moves along the paths.

6. The nozzle in accordance with claim 5 wherein said first outlet is disposed in a first outlet plane and said second outlet is disposed in a second outlet plane removed from said first outlet plane.

7. The nozzle in accordance with claim 6 wherein said second outlet plane, in operation, is disposed forwardly of said first outlet plane.

8. The nozzle in accordance with claim 5 wherein said second portion of said second outlet arm is further removed from said chamber than said first outlet arm in a direction of a lengthwise axis of said chamber.

9. The nozzle in accordance with claim 5 wherein said nozzle comprises a hollow, generally blade-like member.

10. A nozzle for a device for heat welding two overlapping roof membranes to each other, wherein a fastener means is disposed between the overlapping roof membranes, the nozzle being mounted on the device and adapted to effect heat welds to the roof membranes concurrently on both sides of, and adjacent to, the fastener means, said nozzle comprising:

a tubular body defining a chamber for receiving heated air;

a first outlet arm extending from said body and having a first outlet at a distal end thereof;

a second outlet arm extending from said body and having a first portion adjoining said chamber and having an axis transverse to an axis of said first outlet arm, and having a second portion with a second outlet at a distal end thereof, an axis of said second portion being substantially parallel with said axis of said first outlet arm;

said second outlet arm first portion being recessed on an underside thereof so as to permit the fastening means to pass therethrough as the device and said nozzle move along the paths.

11. The nozzle in accordance with claim 10 wherein said first outlet is disposed in a first outlet plane and said second outlet is disposed in a second outlet plane removed from said first outlet plane.

12. The nozzle in accordance with claim 11 wherein said second portion of said second outlet arm is further removed from said body than said first outlet arm in a direction of a lengthwise axis of said body.

13. The nozzle in accordance with claim 11 wherein said first outlet plane is in operation removed rearwardly from said second outlet plane.

14. The nozzle in accordance with claim 10 wherein said nozzle comprises a hollow blade-like member for insertion between the roof membranes.

15. A welding assembly for heat welding two overlapping roof membranes to each other, wherein a fastener means is disposed between the overlapping roof membranes, the welding assembly being mounted on a device adapted to effect heat welds to the roof membranes concurrently on both sides of, and adjacent to, the fastener means, said welding assembly comprising:

a nozzle provided with a chamber for receiving heated air, a first outlet arm extending from said chamber and having a first outlet at a distal end thereof, a second outlet arm extending from said chamber and having a second outlet at a distal end thereof, said first outlet being disposed in a first plane, and said second outlet being disposed in a second plane removed from said first outlet plane;

a first weld wheel mounted on the device adjacent to, and in operation immediately following, said nozzle first outlet;

a second weld wheel mounted on the device adjacent to, and in operation immediately following, said nozzle second outlet; and biasing structure mounted on the device for biasing one of said weld wheels toward the roof membranes in operation of the device.

16. The welding assembly in accordance with claim 15 wherein said one weld wheel is smaller than the other of said first and second weld wheels, and wherein said biasing structure comprises a lever pivotally mounted on the device, said one weld wheel being rotatably mounted on said lever proximate a first end of said lever, said lever proximate a second end thereof being in contact with pressure exerting structure acting on said lever to bias said one weld wheel toward engagement with one of the membranes.

17. The welding assembly in accordance with claim 16 wherein said pressure exerting structure comprises a spring.

18. A nozzle for concurrently directing discrete streams of air along separated and parallel first and second paths, said nozzle comprising:

a chamber for receiving air of a selected temperature;

a first outlet arm extending from said chamber and having a first outlet at a distal end thereof and in a first outlet plane; and a second outlet arm extending from said chamber and having a second outlet at a distal end thereof and in a second outlet plane, an axis of said second outlet arm being generally parallel with said axis of said first outlet arm;

said second outlet plane being offset from said first outlet plane;

wherein said first and second outlets are of different sizes and said nozzle further comprises a divider fixed in said chamber for dividing airflow therefrom to provide for substantially equivalent airflow through said first and second outlets.

19. The nozzle in accordance with claim 18 wherein apertures are provided on a bottom surface of said first outlet arm proximate said first outlet and on a bottom surface of said second outlet arm proximate said second outlet, to provide for pre-heating along said paths.

* * * * *